Oct. 21, 1958  A. E. KUDELKO  2,856,813
SPECTACLE FRAME WITH ADJUSTABLE BRIDGE AND TEMPLES
Filed May 3, 1955
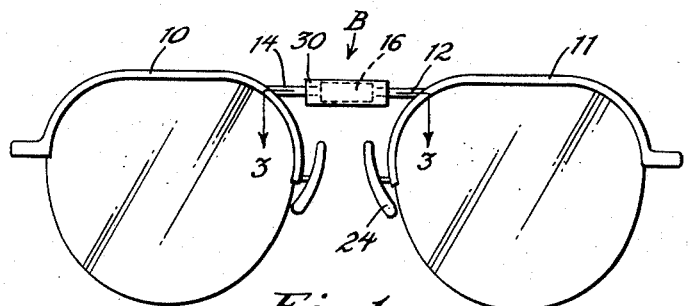
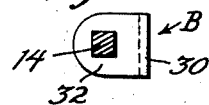
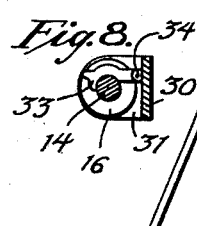
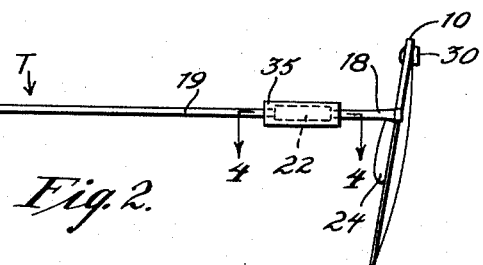
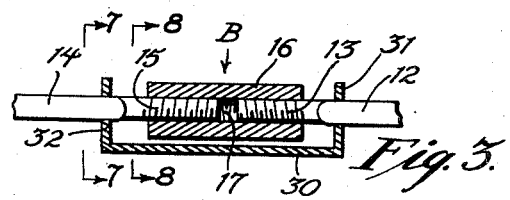
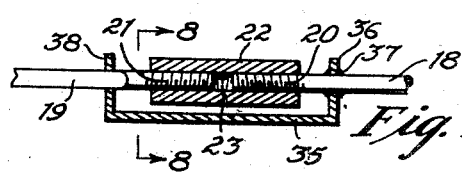
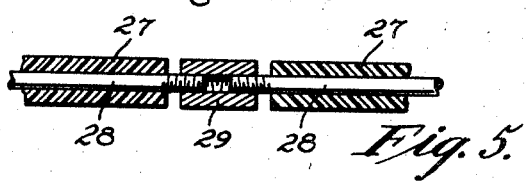
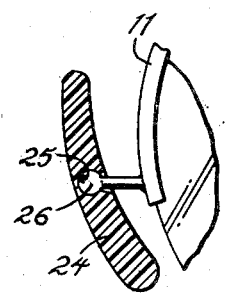
INVENTOR.
ARTHUR E. KUDELKO
BY
John A Robertson
ATTORNEY

United States Patent Office 2,856,813
Patented Oct. 21, 1958

2,856,813

SPECTACLE FRAME WITH ADJUSTABLE BRIDGE AND TEMPLES

Arthur E. Kudelko, Philadelphia, Pa.; Antonia Kudelko, administratrix of said Arthur E. Kudelko, deceased, assignor to Antonia Kudelko as sole heir and beneficiary Application May 3, 1955, Serial No. 505,617

1 Claim. (Cl. 88—41)

The present invention relates to spectacle frames and is concerned primarily with certain novel adjustable features which adapt the frame to be accurately fitted on a wearer's head.

People wearing eyeglasses and spectacles have heads of widely varying shapes and sizes. This means that spectacle frames must be made in different sizes, and even then it takes the skilled optometrist to accurately fit any pair of spectacles to the head of a wearer.

With the foregoing conditions in mind, the present invention has in view as its foremost objective the provision of a spectacle frame that is adjustable to fit any size or shape of a wearer's head within a wide range.

Every spectacle frame of the type with which this invention is concerned includes a pair of temples. One end of each temple is hingedly connected to a lens holder while the other end is ordinarily shaped as a hook that fits about the ear. The effective length of the temples is important in fitting the frame to the head of a wearer. Thus, another somewhat more detailed object of the invention is to provide a spectacle frame including a pair of temples with means for adjusting the effective length of each temple. This means preferably takes the form of a turnbuckle sleeve having bore sections that are oppositely threaded with each section receiving a correspondingly threaded part of the temple.

The effective length of the nose bridge is also an important factor in fitting a spectacle frame to the head of a wearer. Another object of the invention is to provide a spectacle frame having a nose bridge which includes means for adjusting its effective length. This means also preferably takes the form of a turnbuckle sleeve.

Just about every present day conventional spectacle frame includes nose pieces which engage the opposite sides of the nose of the wearer. In accordance with the present invention, these nose pieces are flexible and are adjustably mounted on the frame.

In providing the adjustment in the nose bridge, it is important that the two lens holders that are joined by the nose bridge be held against relative rotation. It is also important that the adjustable bridge be locked in an adjusted position. With these factors in mind, a further object of the invention is to provide, in a spectacle frame of the type noted, an adjustable nose bridge comprising a pair of oppositely threaded stems that are received in a turnbuckle sleeve and which have noncircular portions slidably received in tabs at the end of a shield which covers the sleeve. This shield prevents relative rotation of the stems and carries a locking hook which may be brought into engagement with the threads on one of the stems to lock the bridge in an adjusted position.

It is equally important that the two parts of each temple be held against rotation and a lock provided for holding each temple in an adjusted position. Thus, another object in view is to provide, in a spectacle frame of the character indicated, a pair of adjustable temples, each comprising a part that is hingedly connected to a lens holder and a main body part. These parts are oppositely threaded and received in a turnbuckle sleeve. A shield is permanently anchored to the part connected to the lens holder and has a tab formed with a noncircular aperture slidably receiving a correspondingly shaped portion of the main body part. A lock hook is carried by the shield and is adapted to engage the threads on the main body part to hold the temple in an adjusted position.

It is evident that with the effective length of the temples adjustable, the effective length of the nose bridge adjustable, and the nose pieces flexible and adjustably mounted on the frame, the spectacle frame may be accurately adjusted to fit the head of any wearer over a wide range.

Various other more detailed objects and advantages of the invention, such as arise in connection with carrying out the above-noted ideas in a practical embodiment, will in part become apparent and in part be hereinafter stated as the description of the invention proceeds.

The invention, therefore, comprises a spectacle frame having temples including means for adjusting their effective length, means for holding the parts of each temple against relative rotation, and a lock for holding each temple in an adjusted position; a nose bridge including means for adjusting its effective length, a shield holding the parts of the bridge against relative rotation, and a lock for holding the nose bridge in an adjusted position; and flexible nose pieces adjustably mounted on the frame.

For a full and more complete understanding of the invention, reference may be had to the following description and accompanying drawing wherein:

Figure 1 is a view in front elevation of a spectacle frame designed in accordance with the precepts of this invention.

Figure 2 is a view in side elevation of the spectacle frame.

Figure 3 is a detailed showing taken on an enlarged scale as a section through the adjusting mechanism of the nose bridge. This view is taken about on the plane represented by the line 3—3 of Figure 1.

Figure 4 is another enlarged detailed sectional view through the adjusting mechanism of one of the temples and is taken about on the plane represented by the line 4—4 of Figure 2.

Figure 5 is a sectional view similar to Figure 4 of a modification.

Figure 6 is an enlarged detailed section through one of the nose pieces.

Figure 7 is a detailed sectional view taken about on the plane represented by the line 7—7 of Figure 3; and Figure 8 is a detailed sectional view taken on the plane represented by the line 8—8 of Figure 3 or Figure 4.

Referring now to the drawing wherein like reference characters denote corresponding parts and first more particularly to Figures 1 and 2, it is noted that the spectacle frame of this invention includes two lens holders 10 and 11 which are joined by a nose bridge which is referred to in its entirety by the reference character B. A pair of temples T are hingedly connected to the outer sides of the lens holders 10 and 11 in a well-known manner.

At this point, it is well to note that the invention is illustrated in the drawing as embodied in a particular type of metallic spectacle frame that is now meeting with widespread use. However, this particular type of frame is not a limitation on the invention, because the invention is susceptible of use with other types of frames, particularly those made of plastic, tortoise shell, and similar compositions.

Referring now more particularly to Figure 3, the nose bridge B is shown as including a stem 12 of noncircular cross section that is connected to the lens holder 11 in any preferred manner such as by being formed integrally therewith, and the outer end portion of this stem is threaded as depicted at 13. Another stem 14, also of noncircular cross section, is joined to the lens holder 10 and has a threaded end portion 15 with the threads 15 and 13 being opposite. A turnbuckle sleeve 16 has a bore 17 with oppositely threaded sections which receive the threads 13 and 15 respectively. Obviously, the sleeve 16 may be rotated to either draw the stems 12 and 14 together or expand them, as occasion demands. A shield 30 has end tabs 31 and 32 normal to the main body portion thereof. These tabs 31 and 32 are joined with apertures having a shape corresponding to that of the stems 12 and 14. The latter are slidably received in these apertures and the lens holders 10 and 11 are thereby held against relative rotation. A lock hook 33 (see Figure 8) is pivotally mounted at 34 on the shield 30 and is adapted to engage the threads 15 to lock the nose bridge in an adjusted position.

Referring now more particularly to Figures 2 and 4, each temple T is shown as including a section 18 that is hingedly connected to the respective lens holder and a main body portion 19 of noncircular cross section. The free ends of these sections 18 and 19 are oppositely threaded, as shown at 20 and 21. A sleeve 22 has a bore 23 with oppositely threaded sections which receive the threads 20 and 21. Obviously, each sleeve 22 may be rotated to vary the effective length of the temple in which it is included. A shield 35 has an end tab 36 joined with an opening through which passes the section 18. This tab is permanently secured to the section 18 in any preferred manner such as by the welding indicated at 37. The shield 35 has another end tab 38 formed with an aperture slidably receiving the section 19. A lock hook similar to the hook 33 is carried by the shield 35 and is adapted to engage the threads 21.

Referring now more particularly to Figures 1 and 6, it will be noted that each of the lens holders 10 and 11 carries a nose piece 24. This nose piece 24 is preferably fashioned from material having the property of flexibility to a required degree. Certain of the plastics now available on the market fulfill this need. The important thing is that the nose pieces be sufficiently flexible to accurately conform to and fit the nose of the wearer.

Each nose piece 24 is formed with a recess 25 which operatively receives a flat disc 26 carried by the lens holder. Obviously, the connection established by the disc 26 being received in the recess 25 permits swinging movement of the nose piece 24 in one plane but prevents such swinging movement in other planes.

Figure 5 illustrates a modification of the invention in which the spectacle frame is made from tortoise shell, plastic, or a comparable material. In such a case, the nose bridge and temple will be formed of the material represented at 27. Oppositely threaded stems are embedded in this material at the joints where the adjustment is to be made, and a turnbuckle sleeve 29 has a bore with oppositely threaded sections receiving the threaded stems 28. This turnbuckle sleeve 29 will be of a size whereby it blends and fits in with the other construction.

Operation

While the mode of operation of the spectacle frame of this invention is believed to be obvious from the description of parts given, it may be briefly outlined as follows:

When a particular frame is to be fitted to the head of a particular wearer, the turnbuckle sleeve 16 in the nose bridge B is adjusted to achieve the proper effective length in the nose bridge. During this operation, the shield 30 holds the lens holders 10 and 11 against relative rotation. After the desired adjustment has been achieved, the hook 33 is swung down into engagement with the threads 15 to lock the nose bridge in its adjusted position.

Likewise, the turnbuckle sleeves 22 in the temples T are adjusted to achieve the proper effective length in the temples. During these operations, the shields 35 prevent relative rotation of the temple parts. After each temple has been adjusted, the hook 33 on the shield 35 is swung down into engagement with the threads 21 to lock the temple in its adjusted position.

Moreover, the nose pieces 24 may be moved on the disc 26 to insure of an accurate fitting on the nose. Thus, it is evident that the spectacle frame may be adjusted in every respect to establish an accurate fit.

While preferred specific embodiments of the invention are hereinbefore set forth, it is to be clearly understood that the invention is not to be limited to the exact constructions, mechanisms, and designs illustrated and described, because various modifications of these details may be provided in putting the invention into practice within the purview of the appended claim.

What is claimed is:

In a spectacle frame including a pair of lens holders; a nose bridge comprising a pair of stems each of which is connected to one of said lens holders, each of said stems having a portion of noncircular cross section and a threaded end, and a turnbuckle sleeve having a bore with oppositely threaded ends receiving the threaded ends of said stems whereby said stems and turnbuckle sleeve constitute an adjusting means; a shield for said adjusting means including an intermediate main body portion and end tabs normal thereto with the end tabs having noncircular openings conforming to the noncircular cross section of a portion of each stem which is received in one of said openings; a pair of temples, each of said temples including a section of circular cross section hingedly connected to one of said lens holders and having a threaded end, a main body portion of noncircular cross section and having a threaded end, and a turnbuckle sleeve having a bore with oppositely threaded ends receiving the threaded ends of said temple sections, each of said turnbuckle sleeves and temple sections received therein constituting an adjusting means; a shield for each of said last-mentioned adjusting means comprising an intermediate main body portion and end tabs normal thereto with the end tabs having openings receiving said temple sections, one of said tabs being permanently secured to the temple section of circular cross section with the opening in the other tab having a shape corresponding to the noncircular contour of the other temple section which is slidably received therein; and a latch for at least one of said adjusting means, said latch being pivotally mounted at one end on the intermediate main portion of the shield associated with that adjusting means, extending transversely across one of said threaded ends, and having a hook engageable with a portion of the threaded end across which it extends to lock that adjusting means in an adjusted position.

References Cited in the file of this patent
UNITED STATES PATENTS

| | | |
|---|---|---|
| 1,591,181 | Pollmiller | July 6, 1926 |
| 1,841,052 | Pollmiller | Jan. 12, 1932 |
| 1,930,556 | Hilsinger | Oct. 17, 1933 |
| 2,607,271 | Morse | Aug. 19, 1952 |

FOREIGN PATENTS

| | | |
|---|---|---|
| 19,311 | Great Britain | of 1914 |
| 303,730 | Great Britain | Jan. 10, 1929 |
| 651,710 | France | Oct. 15, 1928 |
| 1,059,612 | France | Nov. 10, 1953 |
| 362,767 | Italy | Sept. 3, 1938 |